United States Patent [19]
Kelley

[11] Patent Number: 5,621,730
[45] Date of Patent: Apr. 15, 1997

[54] MULTIPLE USER DIGITAL RECEIVER APPARATUS AND METHOD WITH TIME DIVISION MULTIPLEXING

[75] Inventor: Edwin A. Kelley, Los Angeles, Calif.

[73] Assignee: Hughes Aircraft Company, Los Angeles, Calif.

[21] Appl. No.: 986,180

[22] Filed: Dec. 7, 1992

Related U.S. Application Data

[63] Continuation-in-part of Ser. No. 714,492, Jun. 13, 1991, abandoned.

[51] Int. Cl.$^6$ ............................................. H04J 1/02
[52] U.S. Cl. ................................ 370/70; 370/50; 370/77; 375/350
[58] Field of Search ............................ 370/20, 50, 70, 370/72, 84, 112, 77; 381/4, 7, 13; 375/17, 103, 241

[56] References Cited

U.S. PATENT DOCUMENTS

| | | | |
|---|---|---|---|
| 4,312,062 | 1/1982 | Bellanger et al. | 370/50 |
| 4,393,456 | 7/1983 | Marshall, Jr. | 370/70 |
| 4,412,325 | 10/1983 | Molo | 370/70 |
| 4,698,680 | 10/1987 | Lewis, Jr. et al. | 370/84 |
| 4,839,889 | 6/1989 | Gockler | 370/70 |
| 4,884,265 | 11/1989 | Schroeder et al. | 370/20 |
| 4,922,537 | 5/1990 | Frederiksen | 375/241 |
| 5,058,107 | 10/1991 | Stone et al. | 370/69.1 |
| 5,220,557 | 6/1993 | Kelley | 370/70 |
| 5,239,540 | 8/1993 | Rovira et al. | 370/77 |
| 5,257,312 | 10/1993 | Therssen et al. | 381/4 |
| 5,263,018 | 11/1993 | Christopher | 370/112 |
| 5,278,837 | 1/1994 | Kelley | 370/50 |
| 5,293,633 | 3/1994 | Robbins | 375/17 |

OTHER PUBLICATIONS

D. Baecher, "Society of Automotive Engineers Technical Paper Series", International Congress & Exposition, 1986, pp. 77–84.
M. Hagiwara, "Digital Signal Processing Type Stereo FM Receiver", IEEE Transactions on Consumer Electronics, vol. CE–32, (Feb. 1986):37–43.
J. Ashjaee, "Ashtech XII CPS Receiver", IEEE International POsition Location & Navagation Symposium, (Nov. 28, 1988): 426–433.

*Primary Examiner*—Douglas W. Olms
*Assistant Examiner*—Shiok Hom
*Attorney, Agent, or Firm*—V. D. Duraiswamy; W. K. Denson-Low

[57] ABSTRACT

A digital receiver apparatus and method, designed for multiple simultaneous users, digitizes a received analog RF signal and tunes to multiple desired frequencies of the received signal on a time division multiplexed basis. After filtering by a finite impulse response (FIR) filter that also operates in time division multiplexing for multiple service bands, the selected signals are digitally demodulated and signal processed, again on a time-shared basis. Different service bands are accommodated at the same time by separate FIR filters, each including a coefficient memory for its particular service band. The multiplexed frequency signal for each band is multiplied by the coefficients of its respective FIR filter memory in a common complex multiplier. The results are demultiplexed and directed to respective accumulators for decimation in accordance with the FIR coefficient characteristics.

9 Claims, 3 Drawing Sheets

MULTIPLE USER DIGITAL RECEIVER APPARATUS AND METHOD WITH TIME DIVISION MULTIPLEXING

This is a continuation-in-part of application Ser. No. 07/714,492 filed Jun. 13, 1991 and now abandoned.

BACKGROUND OF THE INVENTION

1. Field of the Invention

This invention relates to digital RF receivers, and more particularly to digital receiving systems and methods capable of simultaneously servicing multiple users.

2. Description of the Related Art

Conventional automobile radio systems have amplitude modulation (AM) and frequency modulation (FM) capabilities. Many automobiles are also equipped with cellular radios for both reception and transmission. Additional services that utilize other portions of the electromagnetic spectrum and are either currently being implemented, or are expected to be implemented in the future, include facsimile, computer, and global positioning system (GPS) services.

Reception of the various services is complicated by a desire to accommodate multiple simultaneous users. For example, it is desirable to have a capacity for cellular telephone calls at the same time the radio is playing on either AM or FM. It is also anticipated that different users will be able to plug into the communication system at the same time, such as by separate headphones assigned to different passengers, with each passenger having the ability to receive his or her own radio station while the other passengers are listening to their individual stations, using the cellular phone, etc.

The different broadcast bands are very dissimilar in terms of their bandwidths, modulation technology and band operation. The conventional approach to receiving multiple channels over multiple bands is to simply provide multiple receivers, with a separate receiver assigned to each band. If a capability for multiple simultaneous use of a single band is desired, multiple receivers are dedicated to that one band. Each additional receiver carries a penalty in terms of cost, weight, power and space requirements.

Digital receivers have been perceived as a way to accommodate very dissimilar types of modulations with a single receiver mechanism, eliminating the need for different types of receivers for each different service band. Since the channel selection frequency tuning, channel isolation and demodulation are all accomplished digitally, only a single digital receiver path is required for all of these functions. The transition between different broadcasting formats and bandwidths is accomplished by simply changing filter coefficients in the digital filters and the demodulation algorithms in a programmable demodulator. Such a system is envisioned in Stone et al. U.S. Pat. No. 5,058,107, assigned to Hughes Aircraft Company, the assignee of the present invention. While the co-pending patent application achieves a significant reduction in system complexity and cost by using common digital computation for the different service bands, it can provide service to only one user at a time. Multiple receivers would therefore be necessary to service multiple simultaneous users.

Another digital receiver is disclosed in a paper by Dieter Baecher, "Society of Automotive Engineers Technical Paper Series", *International Congress and Exposition*, Detroit, Paper No. 861039, 1986, pages 77–84. An audio-sampled, rather than RF-sampled, digital receiver is discussed. It processes only one received signal at a time; multiple audio sampled digital receivers would be necessary to process multiple signals.

Another digital receiver is disclosed in a paper by Masafumi Hagiwara, "Digital Signal Processing Type Stereo FM Receiver," IEEE Transactions on Consumer Electronics, Vol. CE-32, No. 1, February 1986. An IF (intermediate frequency) —sampled, rather than RF-sampled, digital receiver is discussed. As with Baecher, it processes only one received signal at a time and, therefore, multiple IF sampled digital receivers would be necessary to process multiple signals.

A digital receiver that is capable of handling certain kinds of multiple signals simultaneously is disclosed in J. Ashjaee "Ashtech XII GPS Receiver", *IEEE International Position Location & Navigation Symposium*, Nov. 28, 1988. However, this system is not applicable to common services such as FM, AM or cellular. It is designed for systems such as GPS in which all channels are broadcast at the same frequency, but are provided with different codes. The receiver processes multiple signals by code division multiplexing.

In U.S. Pat. No. 4,884,265 to Schroeder et al., assigned to Loral Corporation, a frequency division multiplexed input signal is digitized. The digitized samples are translated in frequency by mixing with baseband frequency signals to yield real and imaginary values that correspond to phase information in the original modulation signals. After translation, the samples are filtered in real and imaginary digital filters. The original modulation information is then recovered by analysis of the positions of vectors in the complex plane represented by the real and imaginary values. The translation is preferably performed by multiplying the input samples by digital values which correspond to sine and cosine values of local oscillator signals at baseband frequencies. The use of pre-select filtering prior to translation to decimate the input signals, and thereby reduce subsequent processing requirements, is suggested. The system disclosed in this patent again does not resolve the problem of handling multiple simultaneous uses.

SUMMARY OF THE INVENTION

The present invention seeks to provide a digital method and apparatus for receiving and processing RF signals over wavebands that can be widely separated in frequency with different frequency spacings between them, and for providing multiple simultaneous access to unequally spaced signals within those wavebands with hardware that is relatively inexpensive and avoids the redundant capacity encountered in prior systems.

In the accomplishment of these goals, a received RF signal is digitized and then addressed by a digital tuner that selects multiple desired frequencies from the digitized signal. The desired frequency signals are selected on a time division multiplexed basis, and subsequent digital demodulation and signal processing is also preferably performed by time division multiplexing.

To accommodate different service bands at the same time, a separate finite impulse response (FIR) filter is included for each separate service band. Each filter includes a coefficient memory for its particular service band, and an accumulator. The multiplexed frequency signal for each band is multiplied by the coefficients of its respective FIR filter memory in a common complex multiplier, with the results demultiplexed and directed to their respective accumulators. There the data rate is decimated as determined by the FIR coefficient characteristics. The digital demodulator and signal processing sections process the output of each accumulator separately, preferably on a time division multiplexed basis. This permits the digital demodulator and signal processing functions to be implemented on a single programmable digital signal processor (DSP).

If multiple frequency selection from a single service band is desired, only a single FIR filter is required. The time division multiplexed signals for each different frequency are multiplied by common FIR coefficients, with the results demultiplexed and spread among respective accumulators. As in the case of multi-band operation, demodulation and signal processing is preferably performed upon the contents of each accumulator on a time division multiplexed basis. The outputs can then be converted to an analog format suitable for the user.

These and other features and advantages of the invention will be apparent to those skilled in the art from the following detailed description, taken together with the accompanying drawings, in which:

DETAILED DESCRIPTION OF THE INVENTION

The present invention allows simultaneous processing of different frequency signals that may be spread among different service bands, or clustered within a single service band. While numerous different service bands may be accommodated, such as facsimile, computer and GPS mentioned above, the FM, AM and cellular service bands will be discussed herein for purposes of illustration. These services are assigned the broadcast bands of 87.9–107.9 MHz, 0.540–1.600 MHz and 869–894 MHz, respectively.

Figure 1:
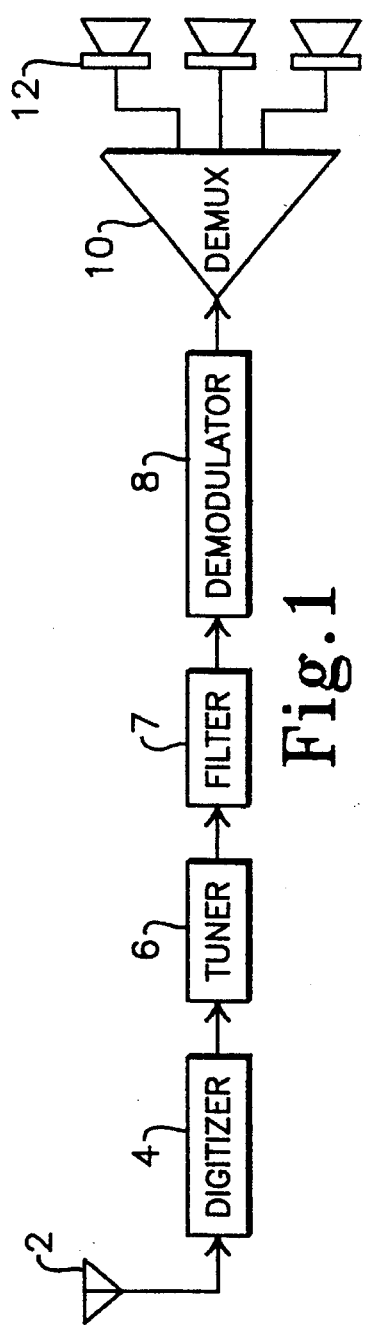
FIG. 1 is a block diagram showing the invention's general approach to processing a received RF signal for multiple simultaneous users.

FIG. 1 provides an overview of the invention's approach to providing simultaneous processing at multiple frequencies within the service bands, with a capability for multiple users to simultaneously obtain outputs at each of the different selected frequencies. An antenna 2 receives the various broadcast signals; this may be implemented as a collection of separate antennas, one for each service band. The received RF signals are converted to digital format by a digitizer 4. The desired frequencies are selected by a digital tuner 6 on a time division multiplexed basis, with successive samples of the received signal at the selected frequencies interlaced with each other in a continuous string. Digital filter 7 is a time multiplexed FIR filter which is used to perform channel isolation filtering on successive time multiplexed samples.

Digital demodulation takes place in synchronism with the tuner multiplexing in a digital demodulator 8; audio processing is also performed on a digital time division multiplexed basis. The processed signals are then converted to analog format and separated into independent analog signal streams by a demultiplexer 10, from which they are available to the users through independent speakers 12 or other output devices.

A more detailed diagram of a preferred embodiment for the invention is provided in FIGS. 2a–d. In this illustration there are three antennas 14a, 14b and 14c, respectively for AM, FM and cellular. The received signals in each service band are boosted by respective amplifiers 16a, 16b and 16c, and then forwarded to respective RF anti-alias filters 18a, 18b and 18c. The characteristics of each filter will depend upon the specific application and requirements, and preferably should have very close to linear phase and minimum loss. Generally, the filters will have an appropriate passband, defined at an appropriate attenuation level such as −3 dB, which extends from the lowest to the highest frequency of its service band. Outside of the passband the location of the stopband edges, defined as an appropriate rejection level such as −100 dB, will depend upon the digitizing sampling rate to the degree that the filter skirts (i.e., the regions between a passband edge and the adjacent stopband edge) from aliased spectral images do not encroach upon the passband of the desired spectral image.

The filtered signals are directed to respective gain controlled amplifiers (GCAs) 19a, 19b and 19c, which can be of known design. The outputs of GCAs 19a–19c are provided to downconverters, 25a, 25b, and 25c which are controlled by synthesizers 23a, 23b, 23c, and fed to mixing filters 27a, 27b, and 27c, respectively, all of known design. The resulting signals are summed in the summing node input of the ADC converter 20.

The full bandwidth covered by AM, FM and cellular (0.540–895 MHz) is generally too wide to be handled by a single ADC of current design. However, a translation of the service bands so that they occupy adjacent portions of the spectrum is proposed in a co-pending application by the present inventor, "Multi-Band Digital Receiving Apparatus and Method With Bandwidth Reduction", Ser. No. 07/714,494, filed Jun. 13, 1991 and also assigned to Hughes Aircraft Company, now U.S. Pat. No. 5,280,636. If the service band translation technique suggested in the co-pending application is used, a single ADC may be employed for all three service bands. Otherwise, a separate ADC may have to be provided for each service band. In this case, ADC 20 consists of an ADC for each service band and each service band ADC sample is then multiplexed to form a single real TDM (time division multiplexed) data stream into complex multiplier 36. If each ADC sample rate is the same, then the TDM data stream will consist of uniform time divisions of samples for each service. If individual ADC sample rates differ, then the resulting TDM data stream will consist of non-uniformly distributed samples for each service and the resulting data control for complex multiplier 36 and filter 7 must be synchronized to accommodate non-uniform TDM data.

The GCAs 19a–19c are controlled by periodically updated feedback digital control words provided by respective digital automatic gain control (DAGC) processors 21a, 21b and 21c, which are responsive to the output of the ADC 20. The DAGC processors 21a–21c can also be of known design, and include peak detection circuitry and control word generating circuitry. The control words are converted to stable analog currents which are utilized to control the gains of the GCAs 19a–19c.

The ADC's sample rate will depend upon (a) whether baseband or passband sampling is utilized, (b) the signal information bandwidth and/or maximum signal frequency, and (c) aliased image location. Baseband sampling requires a sample rate that is at least twice as high as the highest instantaneous frequency contained in the signal being sampled. Bandpass sampling allows for a sample rate that is less than the frequency of the lower band edge, so long as the sample rate is at least twice the bandwidth of the signal provided by the RF anti-alias filters 18a, 18b and 18c. Further information on preferred sampling rates is provided in the co-pending Stone et al. application.

Multiple-user station selection is provided by a multiple simultaneous tuner, shown enclosed in dashed line 22. It consists of a modified programmable direct digital frequency synthesizer. Station select mechanisms 24a, 24b and 24c are provided for each user to select his or her desired AM or FM station; a station select may also be dedicated to another service, such as cellular phone. Respective phase incrementers 26a, 26b and 26c for each selected station are implemented as accumulators and generate a staircase of phase values that approximate a ramp, at a frequency determined by the applicable phase increment of the selected station frequency. To maintain frequency coherence among the multiple frequencies, the phase accumulation for each frequency is performed in a separate accumulator. However, phase increment registers and accumulators require only relatively minor amounts of additional hardware.

The outputs of the phase increment accumulators 26a, 26b, 26c are time division multiplexed by a multiplexer 30, which interlaces the various accumulated signals in time on a single line. The multiplexing sample rate is controlled by a clock 32. The output of multiplexer 30 is applied to a sine/cosine read only memory (ROM) 34 that stores codes which translate the values accumulated in the accumulators 26a, 26b, 26c to digitized sine and cosine outputs, and are the real and quadrature components of the digital synthesized frequency. The output sinusoidal waves will preferably have about 14 bit accuracy, requiring approximately $2^{16}$ entries in the ROM. The sampled digital sine and cosine outputs have the same frequencies as the carrier frequencies of the selected stations to be tuned. The sine/cosine table lookup ROM is clocked at a higher frequency than the phase incrementors to generate multiple frequency words. For example, assuming the use of three phase incrementors that are each clocked at a 10 MHz rate, the sample rate at which the sine/cosine ROM 34 is addressed will be 30 MHz.

The output of the sine/cosine ROM 34 is applied to a complex multiplier 36, where it is mixed with the digitized input signal from ADC 20. Complex mixing is utilized because this allows the entire spectrum to be shifted in one direction, as distinguished from "real" mixing (i.e., where only one multiplication is utilized) which can result in distortion producing overlapping images. As is well known, real mixing produces four images of the original positive and negative spectral images.

The complex output of the digital complex mixer (multiplier) 36 is directed to a finite impulse response (FIR) filter arrangement that serves as a bandpass filter for each of the multiplexed service bands. Separate FIR ROMs 38a, 38b, 38c store FIR coefficients for each separate service band. The FIR coefficients are used to compute a complex low pass FIR filter and are determined by any of several methods well known in the art. The preferred approach is to use the coefficients necessary to create an optimum 1/nth-band filter, where n is the decimation factor. When only a single service band is used, such as three users all tuned to different FM stations, only a single FIR ROM with FM coefficients is required. The number of coefficients per ROM will vary according to the original sample rate and the final data rate, but generally will fall within the range of about 20–2000. The bit representation accuracy of the FIR coefficients is highly dependent upon the desired filter shape and stopband depth, but generally will fall within the range of about 12–16 bits.

The FIR ROMs are addressed in a time division multiplexed fashion, in synchronism with the signal multiplexing from the tuner 22, by a multiplexer 40 that also operates under the control of clock 32. The digital signals for each service band from the tuner 22 are multiplied in a second complex multiplier 42 by the FIR ROM coefficients for their respective service bands. The results of this multiplication are separated into three data streams by demultiplexer 44, and forwarded to respective vector accumulators 46a, 46b and 46c for each selected station. In the preferred approach, using coefficients for an optimal 1/nth-band filter, these accumulators are each vectored at least two deep in the time dimension and two wide in the complex dimension, for a total of at least four accumulators each. The time dimension is the number of filter taps divided by the decimation rate n. In this arrangement, no intermediate data storage is required and all filtering and decimation is accomplished into the vector accumulators with a sum and dump operation. Each successive input datum to complex multiplier 42 is multiplied by a successive coefficient for its corresponding service band, with the accumulators 46a, 46b, 46c for each selected station adding the results of the multiplication for its respective input signal. At a time point n/2 later, a second operation is performed in which each successive input datum to complex multiplier 42 is multiplied by successive coefficients and summed in the second bank of complex accumulators 46a, 46b and 46c. FIR ROMs 38a, 38b, and 38c and complex multiplier 42 are clocked at a rate at least twice the TDM rate and therefore form a staggered sliding window FIR. The data rate output from the accumulators is thus decimated by a factor n. The number of bits required in the arithmetic elements in the complex multiplier and FIR filter is dependent on the SNR (signal-to-noise ratio) of the input signals and the dynamic range requirements of the processed signal. As is well known in the art, the required number of bits generally increase in the arithmetic processing chain due to the signal processing and decimation processes.

The filtered and accumulated samples for each selected station are then demodulated and audio processed. Preferably a single digital signal processor (DSP) is used for all of the stations. The Texas Instruments TMS320C30 DSP is suitable for this purpose. The signal processor software used for FM demodulation and audio processing (including stereo decode) is similar to the demodulation algorithm shown in the earlier referenced paper by Hagiwara and requires less than 10 million instructions per second (MIPS), whereas the TMS320C30 DSP is capable of about 33 MIPS. Thus, three separate stations can be processed jointly. This is accomplished by accessing the contents of the three accumulators 46a, 46b, 46c on a time division multiplexed (time shared) basis. The signal pulses 48a, 48b, 48c to the right of the accumulators illustrate their relative sampling sequence under the control of clock 32.

The digital processing system downstream of the FIR filter accumulators consists of digital demodulators 50a, 50b, 50c that remove the carrier signals from their respective decimated inputs, stereo decoders 52a, 52b, 52c that separate the left and right stereo signals for each selected station, digital audio processors 54a, 54b, 54c that condition the signals with functions such as tone control, volume control, etc., and digital-to-analog converters (DACs) 56a, 56b, 56c that convert the processed digital signals to analog format; the DACs may be considered to be part of the audioprocessor function. The DACs also serve a demultiplexing function in the sense that the digital signals presented to them, although separated on different lines, occupy multiplexed time frames. The DAC outputs, by contrast, are each continuous analog signals. The analog signals, after appropriate amplification (not shown) are connected to operate respective speakers 58a, 58b, 58c or other desired output devices.

The digital demodulation, stereo decode and audio processing functions are conventional for a single channel, and are discussed for example in the Hagiwara reference mentioned above. By time-sharing its throughput, the programmable DSP operates upon the data stream for each selected station independently. In this manner a single processor can be used to demodulate, decode and audio process a number of distinct stations simultaneously. If the multiple signal paths in the programmable DSP are for different service bands, different demodulation algorithms are required for each service band. When only a single service band is being received, such as FM, a single algorithm may be used for each selected station.

Figure 3:
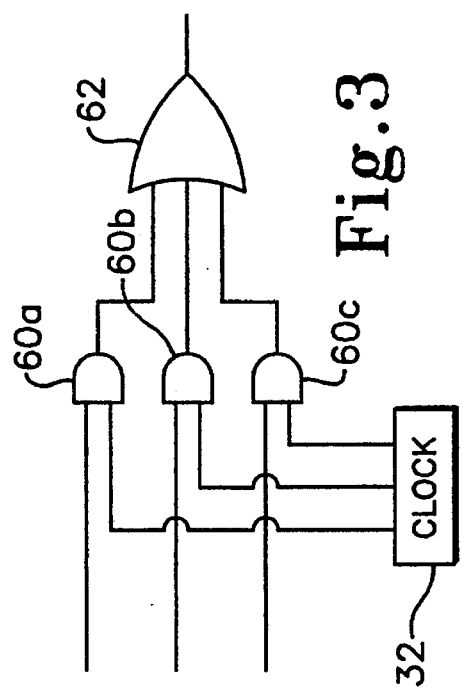
FIG. 3 is a schematic diagram of a multiplexer employed in the system of FIGS. 2a–b.
Figure 2A:
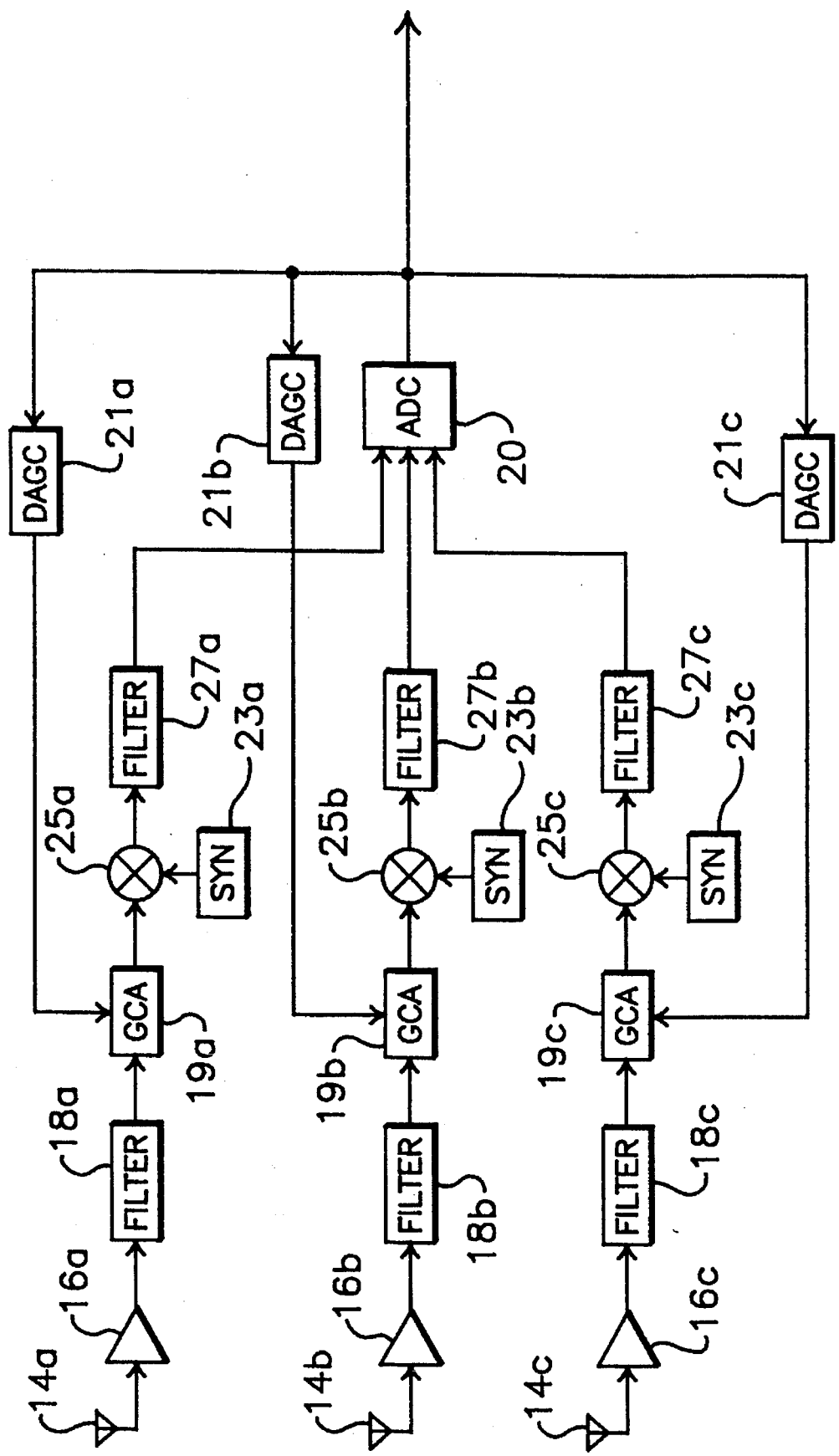
FIGS. 2a–b are schematic diagrams of respective portions of a preferred embodiment of the invention.
Figure 2B:
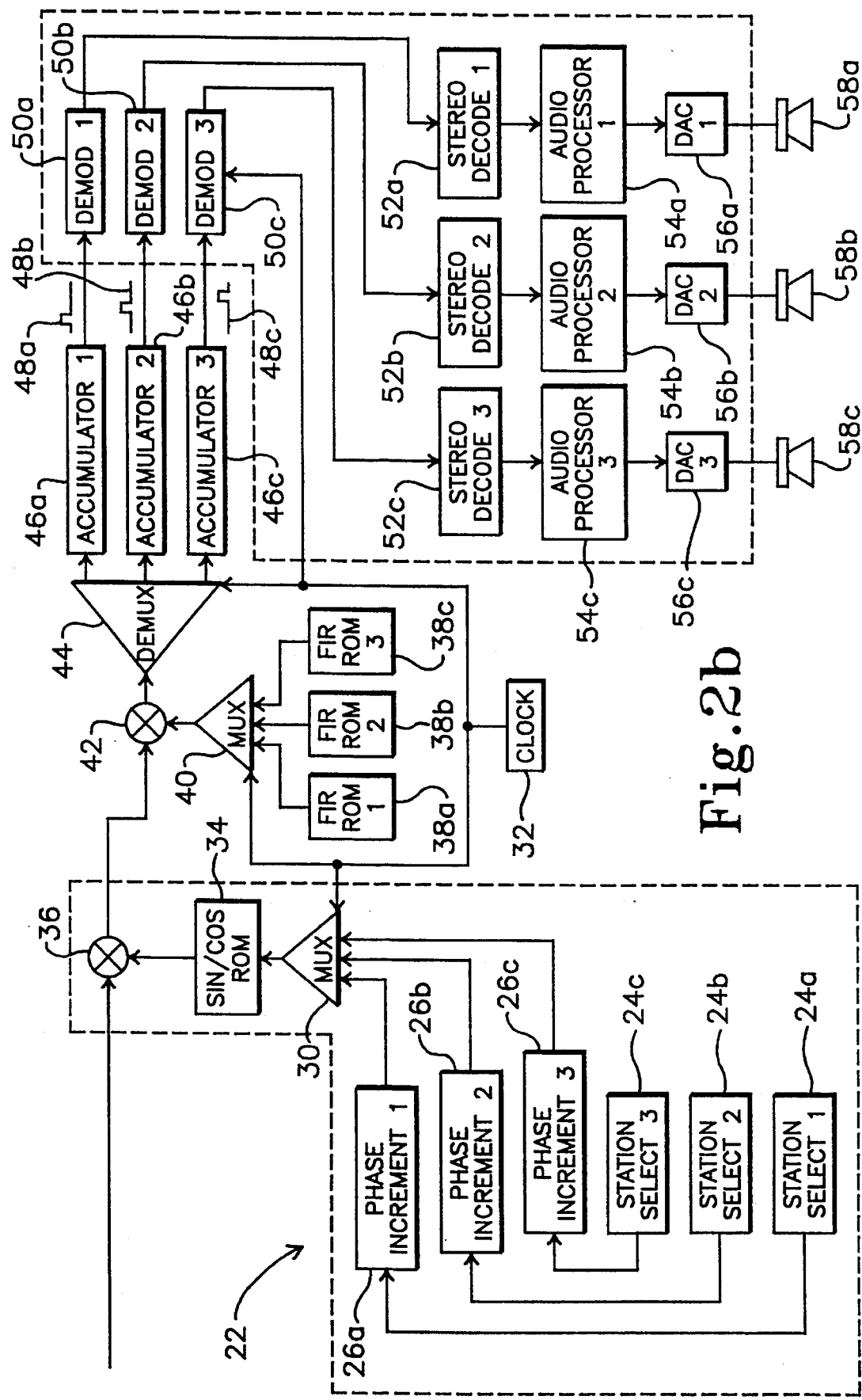

An example of a multiplexer that can be used for either the tuner 22 or the FIR filter is illustrated in FIG. 3. AND gates 60a, 60b, 60c each have one input connected to receive a respective signal from accumulators 26a, 26b, 26c (for tuner 22), or the output of a respective FIR coefficient ROM 38a, 38b, 38c (for the FIR filter). The other inputs to the AND gates are activated in sequence on a time division multiplexed basis by clock 32. The outputs from the AND gates are supplied as inputs to an OR gate 62. This latter gate outputs a single data stream that includes samples from the three AND gates 60a, 60b, 60c on an interleaved, time division multiplexed basis.

Figure 4:
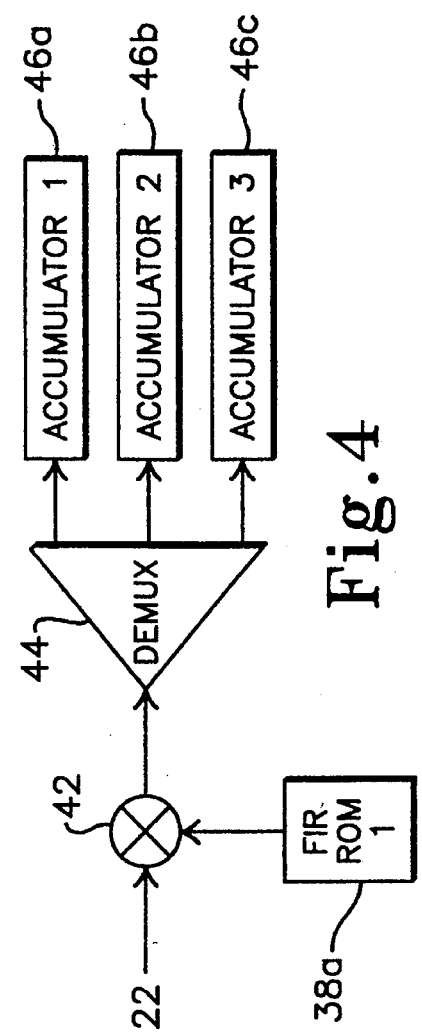
FIG. 4 is a schematic diagram illustrating a FIR filter employed in an alternate embodiment in which only a single service band is received.

A modification of the FIR filter that may be used when only multi-station FM reception is desired is shown in FIG. 4. A single FIR ROM 38a, which stores the FIR coefficients for FM service, supplies its coefficients directly to the complex multiplier 42. Since only a single FIR ROM is used, there is no need to multiplex its output. However, the time division multiplexed signals from tuner 22 are still divided among accumulators 46a, 46b, 46c to maintain their discrete nature during subsequent time division multiplexed demodulation and audio processing.

While several illustrative embodiments of the invention have been shown and described, numerous variations and alternate embodiments will occur to those skilled in the art. Such variations and alternate embodiments are contemplated, and can be made without departing from the spirit and scope of the invention as defined in the appended claims.

I claim:

1. A multiple use radio frequency (RF) receiver, comprising:

means for providing anti-alias filtering for a received analog RF signal;

gain control amplifier means for providing amplification to the filtered and received analog RF signal;

means for digitizing the amplified, filtered and received analog RF signal;

multiple simultaneous digital tuner means for selecting, by time division multiplexing, signals at at least three desired frequencies from the digitized signal, with said desired frequencies distributed at unequal frequency spacings along a frequency spectrum, said digital tuner means consisting of a modified programmable direct digital frequency synthesizer, selecting signals at said desired frequencies from separate RF service bands that are distributed at unequal frequency spacing along said frequency spectrum;

digital filter means for isolating the signals at the desired frequencies selected by said tuner means from interfering signals by time division multiplexing, said digital filter means comprising a plurality of digital finite impulse response, FIR, filters that include respective FIR filter coefficient memories corresponding to said service bands, means for digitally time division multiplexing among said FIR filter coefficient memories, in synchronism with said multiple simultaneous digital tuner means, and means controlling said multiplexing among said FIR filter coefficient memories in synchronism with the selection of signals at said desired frequencies from a digitized signal so that the selected frequency signals for each service band are processed by a corresponding FIR filter coefficient memory for that service band, said FIR filters including respective accumulators for each of said service bands, a complex multiplier for multiplying multiplexed selected frequency signals by the FIR filter coefficients for their respective service bands, and de-multiplexing means for directing the results of said multiplications for each service band to a respective accumulator; and digital demodulator and signal processing means for digitally demodulating and signal processing the signals at the desired frequencies selected by said tuner means and isolated by said digital filter means, wherein digital demodulation occurs in synchronism with digital tuner multiplexing.

2. The multiple user radio frequency receiver of claim 1 wherein said modified programmable direct digital frequency synthesizer comprises accumulators and generates a staircase of phase values which approximates a ramp at a predetermined frequency.

3. The RF receiver of claim 1, said digital demodulator and signal processing means processing the output of each accumulator separately.

4. The RF receiver of claim 3, said digital demodulator and audio processing means separating the processing of the output of each accumulator by time division demultiplexing.

5. The RF receiver of claim 4, wherein said digital demodulator and signal processing means are implemented by a single digital signal processor programmed to perform said time division multiplexed processing.

6. A multiple use radio frequency (RF) receiver, comprising:

means for providing anti-alias filtering for a received RF signal;

gain control amplifier means for providing amplification to the filtered RF signal;

means for digitizing the filtered and amplified received analog RF signal;

digital tuner means for selecting, by time division multiplexing signals at least three desired frequencies from the digitized signal, with said desired frequencies distributed at unequal frequency spacings along a frequency spectrum, said digital tuner means selecting said signals from a single RF service band;

digital filter means for isolating the signals at the desired frequencies selected by said digital tuner means from interfering signals, said digital filter means comprising a digital finite impulse response, FIR, filter that includes a filter coefficient memory, containing the FIR filter coefficients, for said service band, respective accumulators for the signals at each of said desired frequencies, a complex multiplier for multiplying the signals at the frequencies selected by said tuner means by said FIR filter coefficients from said memory, and demultiplexing means for directing the results of multiplications for each desired frequency to a respective accumulator; and digital demodulator and signal processing means for digitally demodulating and signal processing the signals at the desired frequencies selected by said tuner means and isolated by said digital filter means.

7. The RF receiver of claim 6, said digital demodulator and signal processing means processing the output of each accumulator separately.

8. The RF receiver of claim 7, said digital demodulator and audio processing means separating the processing of the output of each accumulator by time division demultiplexing.

9. The RF receiver of claim 8, wherein said digital demodulator and signal processing means are implemented by a single digital signal processor programmed to perform time division multiplexed processing.

* * * * *